(12) United States Patent
Zhang et al.

(10) Patent No.: US 10,367,909 B2
(45) Date of Patent: Jul. 30, 2019

(54) METHOD, DEVICE, AND SYSTEM FOR DISPLAYING INFORMATION ASSOCIATED WITH A WEB PAGE

(71) Applicant: Alibaba Group Holding Limited, George Town (KY)

(72) Inventors: Xiangming Zhang, Hangzhou (CN); Haiqing Zhu, Hangzhou (CN); Xuning Liu, Hangzhou (CN); Liang Rao, Hangzhou (CN); Qikun Huo, Hangzhou (CN); Zhaomeng Shen, Hangzhou (CN); Peng Xiang, Hangzhou (CN)

(73) Assignee: Alibaba Group Holding Limited (KY)

( * ) Notice: Subject to any disclaimer, the term of this patent is extended or adjusted under 35 U.S.C. 154(b) by 213 days.

(21) Appl. No.: 15/286,840

(22) Filed: Oct. 6, 2016

(65) Prior Publication Data

US 2017/0111467 A1    Apr. 20, 2017

(30) Foreign Application Priority Data

Oct. 14, 2015    (CN) .......................... 2015 1 0663317

(51) Int. Cl.
　　*G06F 15/16*　　(2006.01)
　　*H04L 29/08*　　(2006.01)
　　*G06F 17/22*　　(2006.01)
　　*G06F 16/954*　　(2019.01)

(52) U.S. Cl.
　　CPC ........ *H04L 67/2847* (2013.01); *G06F 16/954* (2019.01); *G06F 17/2247* (2013.01); *H04L 67/306* (2013.01); *H04L 67/02* (2013.01)

(58) Field of Classification Search
　　CPC ... H04L 67/2847; H04L 67/02; H04L 67/306; G06F 17/2247; G06F 17/30873
　　See application file for complete search history.

(56) References Cited

U.S. PATENT DOCUMENTS

| | | |
|---|---|---|
| 6,581,072 B1 | 6/2003 | Mathur |
| 6,757,709 B1 * | 6/2004 | Oberdorfer ............ G06Q 10/10 707/999.1 |
| 7,031,968 B2 | 4/2006 | Kremer |
| 7,210,101 B2 * | 4/2007 | Terashima ........ G06F 17/30905 707/E17.121 |
| 7,770,105 B2 * | 8/2010 | Terashima ........ G06F 17/30905 715/234 |
| 7,831,706 B1 | 11/2010 | McCullough |

(Continued)

*Primary Examiner* — Moustafa M Meky
(74) *Attorney, Agent, or Firm* — Van Pelt, Yi & James LLP

(57) ABSTRACT

Embodiments of the present application relate to a method, device, and system for displaying information. The method includes receiving a web page access request, in response to receiving the web page access request, displaying a first web page and obtaining designated information associated with the first web page, the first web page being associated with the web page access request and the designated information including content of the first web page, receiving an instruction to navigate to a second web page, in response to receiving the instruction to navigate to the second web page, communicating the designated information to a server associated with the second web page, and displaying the second web page, the second web page including information communicated by the server associated with the second web page.

25 Claims, 8 Drawing Sheets

(56) References Cited

U.S. PATENT DOCUMENTS

| | | | |
|---|---|---|---|
| 8,503,021 B2* | 8/2013 | Tamura | H04N 1/00204 |
| | | | 358/1.15 |
| 8,782,507 B2* | 7/2014 | Ran | G06F 17/30905 |
| | | | 715/206 |
| 8,959,209 B1* | 2/2015 | D | G06F 17/30899 |
| | | | 707/723 |
| 9,172,761 B2 | 10/2015 | McCullough | |
| 9,330,194 B2* | 5/2016 | Nakamura | G06F 17/30899 |
| 9,467,497 B2* | 10/2016 | Sugaya | H04L 67/02 |
| 9,756,201 B2* | 9/2017 | Kano | H04N 1/00464 |
| 2003/0218629 A1* | 11/2003 | Terashima | G06F 17/30905 |
| | | | 715/738 |
| 2005/0108390 A1 | 5/2005 | Nickerson | |
| 2011/0066697 A1 | 3/2011 | Lv | |
| 2011/0083067 A1 | 4/2011 | Shim | |
| 2011/0238745 A1* | 9/2011 | Nakamura | G06F 17/30899 |
| | | | 709/203 |
| 2011/0295946 A1* | 12/2011 | Otsuka | G06F 3/121 |
| | | | 709/203 |
| 2012/0089996 A1 | 4/2012 | Ramer | |
| 2012/0173627 A1 | 7/2012 | Von Tetzchner | |
| 2012/0203734 A1 | 8/2012 | Spivack | |
| 2013/0167008 A1* | 6/2013 | Jo | G06F 17/3089 |
| | | | 715/234 |
| 2014/0019431 A1 | 1/2014 | Suleyman et al. | |
| 2014/0181639 A1 | 6/2014 | Lund | |

\* cited by examiner

300

METHOD, DEVICE, AND SYSTEM FOR DISPLAYING INFORMATION ASSOCIATED WITH A WEB PAGE

CROSS REFERENCE TO OTHER APPLICATIONS

This application claims priority to People's Republic of China Patent Application No. 201510663317.8 entitled A METHOD, A DEVICE AND A SMART TERMINAL FOR DISPLAYING INFORMATION, filed Oct. 14, 2015 which is incorporated herein by reference for all purposes.

FIELD OF THE INVENTION

The present application relates to a field of computer technology. In particular, the present application relates to a method, a device, and a smart terminal for displaying information.

BACKGROUND OF THE INVENTION

As the use of all kinds of terminals becomes widespread, the number of terminal applications (also referred to as apps) has greatly increased. The terminals include, but are not limited to, mobile phones, tablet computers, personal computers, smart watches, and vehicle-mounted mobile stations.

Generally, different apps to be run on terminals are provided separately by different Independent Software Vendors (ISV). A user may use an app to obtain service information provided by the ISV server associated with the app. Apps may display corresponding service information in the form of a web page. Accordingly, users may use a public browser or a browser embedded within an app to browse the web page so as to view the service information.

According to conventional use of apps, a user uses multiple apps to acquire corresponding multiple pieces of related service information. For example, a user may purchase a ticket for a movie on a purchasing app. After purchasing the ticket, the user may also view reviews of the movie on a movie review app and view the latest news (e.g., from a news source such as Weibo) about the movie's leading actors on the corresponding news app (e.g., the Weibo app). In this case, the ticket information for the movie, the movie review, and the latest news on the movie's leading actors are multiple pieces of the related service information.

However, because each app is independent of each other, the user in the application scenario of the example above would need to separately open each app and separately look up the appropriate service information in each app, and the browser would have to separately send each web page including this service information to the user for display. Clearly, such an approach involves the user in many annoying operations. The browser inefficiently displays multiple pieces of related service information provided by different apps.

BRIEF DESCRIPTION OF THE DRAWINGS

Various embodiments of the invention are disclosed in the following detailed description and the accompanying drawings.

The drawings described here are intended to further the understanding of the present application and form a part of this application. The illustrative embodiments of the present application and the descriptions thereof are intended to explain this application and do not constitute inappropriate limitation of the present application. Among the drawings.

DETAILED DESCRIPTION

Figure 1:
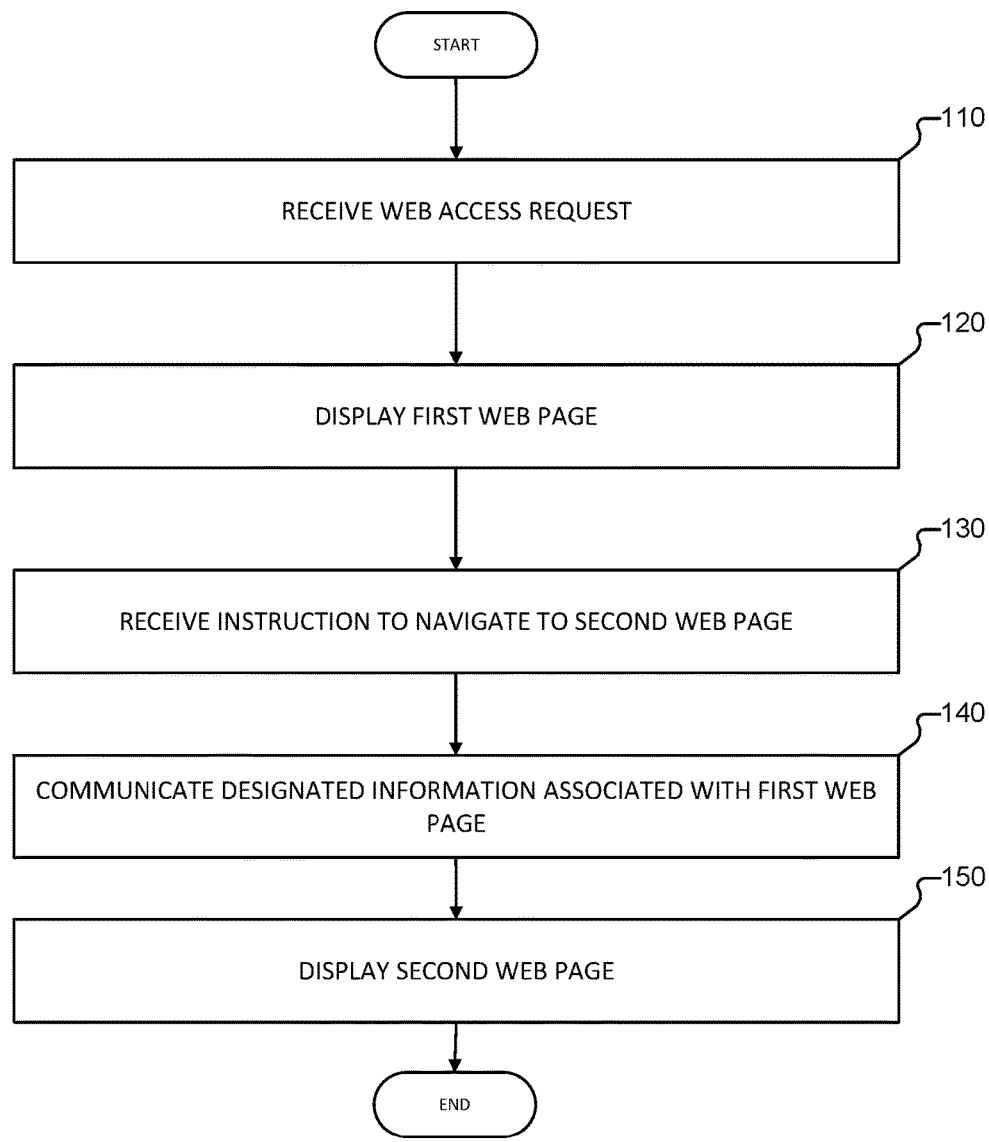
FIG. 1 is a flowchart of a method of displaying information according to various embodiments of the present application.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

So as to further clarify the objectives, technical schemes, and advantages of the present application, technical schemes of the present application are described clearly and completely below in light of specific embodiments and corresponding drawings of the present application. Obviously, the embodiments described are only some of the embodiments of the present application and are not all the embodiments. All other embodiments obtained on the basis of the embodiments of the present application by persons with ordinary skill in the art shall fall within the scope of protection of the present application so long as no inventive effort is made in the course of obtaining them.

As used herein, a terminal generally refers to a device used (e.g., by a user) within a network system and used to communicate with one or more servers. According to various embodiments of the present disclosure, a terminal includes components that support communication functionality. For example, a terminal can be a smart phone, a tablet device, a mobile phone, a video phone, an e-book reader, a desktop computer, a laptop computer, a netbook computer, a personal computer, a Personal Digital Assistant (PDA), a Portable Multimedia Player (PMP), an mp3 player, a mobile medical device, a camera, a wearable device (e.g., a Head-Mounted Device (HMD), electronic clothes, electronic braces, an electronic necklace, an electronic accessory, an electronic tattoo, or a smart watch), a smart home appliance, vehicle-mounted mobile stations, or the like. A terminal can run various operating systems.

As used herein, a server generally refers to personal computers, large or medium-sized computers, computer clusters, or the like.

In some embodiments, a web browser and/or a standalone application is installed at each terminal, enabling a user to access a service (e.g., an e-commerce website) hosted by one or more servers.

FIG. 1 is a flowchart of a method of displaying information according to various embodiments of the present application.

Referring to FIG. 1, process 100 can be implemented in connection with accessing or otherwise obtaining information from one or more servers associated with a web page or app. Process 100 can be implemented in connection with system 700 of FIG. 7 and to display information of FIG. 3. Process 100 can also be implemented by device 400 of FIG. 4, device 500 of FIG. 5, or terminal 600 of FIG. 6. Process 100 can also be implemented by computer system 800 of FIG. 8. In some embodiments, process 100 can be performed by a browser on a computing device such as a server or a terminal.

At 110, a web access request is received. The web access request can be received by a server such as, for example, a web server (e.g., a server associated with a web service or a web page). The web access request can correspond to a web page access request. The web access request can be directed to the address of the web server. In some embodiments, the web access request can be received from a terminal. In some embodiments, in response to the web access request being received from the terminal, information associated with the web access request (e.g., information corresponding to the web page associated with the web access request) is communicated to the terminal (e.g., by the web server).

In some embodiments, the web access request can be received by a terminal. For example, the terminal can receive an input from a user (e.g., a touch input or the like) corresponding to a request to navigate to, or otherwise access, a web service or web page associated with the web access request. The web access request can include a web address associated with the web service, web page, or the like. In some embodiments, the web access request can be received from another program or app being executed by the terminal. The web access request can be input to a browser client (e.g., a web browser) executed on the terminal.

At 120, in the event that a web access request is received, a first web page corresponding to the web page access request is displayed. In some embodiments, in the event that the web access request is received, designated information related to a first web service, first web page, or the like can be obtained. In some embodiments, designated information includes the content of the first web page. For example, if the first web page corresponds to a news website or news service, the content of the first web page can include news such as current events, news reports, or the like. As another example, if the first web page corresponds to a sports website, the content can include scores, team news, player news, videos, images, or the like. Other types of content can be obtained (e.g., depending on the specific website or web service associated with the web access request). In the event that process 100 is performed on a server, the first web page corresponding to the web page access request is communicated to a terminal (e.g., a client) to display the first web page.

In some embodiments, in the event that the web access request is received by the terminal, the obtaining of the designated information related to the first web service, first web page, or the like, can include sending a request to a server associated with the first web service, first web page, or the like.

In some embodiments, the browser client is an independent app on a terminal. In some embodiments, the browser client is a functional module embedded in another app on a terminal. The browser client can be used to browse web pages on a website or web pages contained in an app. In some embodiments, the app can be an app in the form of a web page, such as an app based on Hyper Text Markup Language (HTML). In some embodiments, the app can be a native app (e.g., an application program that has been developed for use on a particular platform or device such as the terminal).

In some embodiments, the web access request corresponds to a request sent by (e.g., input by) the user entering a web address through a browser. In some embodiments, the web access request corresponds to a request sent by a user clicking on a hyperlink in an app on a terminal. The web access request can be received by various other methods. The web address can correspond to a Universal Resource Locator (URL), a URL with special formatting such as an open URL, an Internet Protocol (IP) address, or the like.

In some embodiments, the obtaining of designated information may be implemented in multiple ways. For example, some embodiments use preset script information to acquire the designated information. Some embodiments use a preset rule or function code to obtain the designated information or to obtain information that was designated by the user in advance or in real time and to use it as said designated information, and so on. For example, in the event that a movie theater ticket and related information are displayed on a page, the user's current location is displayed in relation to the cinema. In addition, the cost of taking a taxi form the user's current location to the cinema is displayed on the page (e.g., at the bottom of the page). A pre-set script can be run to obtain the user's current location and/or to obtain the location of the cinema (e.g., obtaining the specific location of the cinema from a web page). Specific function modules can be called to generate a template (e.g., to populate a template with corresponding information). In this example, the template can be based on the input departure and destination, calculate the distance taxi and taxi costs. Information with which to populate the template can be obtained from the client (e.g., one or more sensors on the client), from a third party server (e.g., the website associated with the cinema), or the like. In some embodiments, the obtaining of the designed information includes sending a request to a server associated with the information (e.g., a server on which the information is stored, etc.). The designated information can be stored in various locations. Information such as the script information, the rule, or the function code can be stored in various locations. For example, the information can be stored on a browser client, a browser server, a gateway server, a web page server, etc.

In some embodiments, the browser client is a standalone application on the terminal. In other embodiments, the browser client is built on the other end of the application modules. A browser client can be used to access stored on an application of the terminal. In the event that the browser application is configured on a browser server, data can be obtained from the application corresponding to the browser server. Data can also be obtained from one or more other application servers. For example, data associated with a web page or data for an application running on a client can be obtained from an application server or the browser server. For example, in connection with a web service to obtain movie tickets. The default script information can be stored on the client, and specific information about the theater (e.g., location information) can be obtained from an application server. The default script can calculate the distance and/or the origin and destination (e.g., the location of the theater). In some embodiments, an application server or other third-party server can be used in connection with calculating the distance and or the origin and destination. For example, the application server or a third-party server can provide third-party map service or a car service business end of the service.

According to various embodiments, the designated information can be obtained before or after the displaying of the first web page.

In some embodiments, the designated information (e.g., the web page-related designated information) may be directly included in the first web page. For example, the designated information can be metadata, tags, the logo, the banner, or previously looked up key words within the first web page. The designated information could also be information obtained in connection with accessing the first web page. For example, the designated information can include public information about a currently logged-in user or behavioral characteristic data about the currently logged-in user collected by the browser server or by a server for other apps. The currently logged-in user can correspond to a user associated with the account with which the terminal accesses the first web page.

Process 100 is further described in the context of an example according to which the first web page is an order information web page for purchasing a movie ticket in a ticket-purchasing app. Thus, in order to efficiently provide the browser with multiple pieces of movie-related service information for displaying to the user, the designated information relating to the order information web page can be information relating to the movie, such as the movie title, theme category, name of leading actor, name of director, etc.

At 130, an instruction or request to navigate to a second web page (or address associated with a web service) is received. In some embodiments, the instruction or request to navigate to the second web page is received in connection with the display of the first web page. For example, the instruction or request to navigate to the second web page can be received in response to a user input (e.g., to a link displayed on the first web page) to the first web page. As another example, the instruction or request to navigate to the second web page can be received in response to the execution of a script or code (e.g., Javascript or the like) associated with the display of the first web page.

At 140, the designated information (e.g., information associated with the first web page or first web service or the like) is communicated to a server. The terminal can communicate the designated information to the server. In some embodiments, the designated information is communicated to a server associated with a second web page (or a second web service or the like). In response to receiving the instruction or request to jump from the displayed first web page to another web page (e.g., a second web page), the designated information is sent to the server of the other web page (e.g., the server that hosts, or is otherwise associated with, the second web page, second web service, or the like).

In some embodiments, the other web page (e.g., the second web page, the second web service, or the like) and the first web page (or the first web service, or the like) corresponding to the web page access request may correspond to resources accessed by different apps. In some embodiments, the second web page and the first web page may be associated with (e.g., correspond to) the same app. For example, the same app can be used to access the resources of the first web page and the second web page. Embodiments of the present application are described primarily with respect to the former situation. As an example, in the event that the first web page corresponding to the web page access request is an order information web page of a ticket-purchasing app, and the other web pages (e.g., the second web page) can correspond to web pages of other apps such as a movie review app or a news app (e.g., the Weibo app).

In some embodiments, the instruction or request to navigate to (e.g., access) the second web page can include the corresponding web address of the second web pages. The request can be an HTTP request, a deep link request, or the like. In some embodiments, the instruction or request to navigate to the second web page can include web addresses of a plurality of second web pages. The second web pages can correspond to various different web pages. The instruction or request to navigate to the second web page can be generated in response to a user selecting (e.g., clicking on) a button or hyperlink.

In some embodiments, the web addresses of the other page (e.g., the second web page) can be communicated to one or more servers of the other web page. For example, in addition to sending the designated information, the web addresses of the other web pages are sent to the servers of the other web pages so that the servers of the other web pages can locate the other web pages.

In some embodiments, an app can navigate to a web page from a displayed web page to another web page. For example, the app can jump from the displayed first web page to the second web page. In some embodiments, the app can navigate from a displayed web page to a deep link native app interface or to another target such as a specific component (such as a sharing component or a translation component). In some embodiments, in response to receiving a jump action instruction, the designated information may be sent to the server of the other target (e.g., the server of the second web page, the second web service, or the like). A jump instruction can be an http request, a deep link request, or the like. As an example, the jump instruction can be generated in connection with a user clicking on a hyperlink.

In some embodiments, the other web pages (e.g., the second web page, the second web service, or the like) and the first web page corresponding to the web page access request correspond to different apps. Therefore, it is possible to achieve information sharing between different apps and to open services between different apps by sending the designated information to the servers of the other web pages. The communication of the designated information to the servers of the second web page or second web service can reduce redundant operations performed on different apps by the user and increase the convenience of the user in obtaining related service information provided by different apps.

At 150, the second web page is displayed. In some embodiments, information associated with the second web page or second web service can be received, and such information can be displayed. For example, the information can correspond to content associated with the second web page or second web service. A terminal can receive the information from a server associated with the second web page or second web service. In some embodiments, displaying the second web page comprises displaying the web page that was sent back by the server of the other web page (e.g., the second web page) and that was generated after processing the other web page according to the designated information. For example, in some embodiments, the server associated with the second web page obtains the designated information (e.g., designated information associated with the first web page), processes the second web page based at least in part on the designated information (e.g., parsing the second web page for certain information, metadata, or the like), and returns (e.g., communicates to the terminal) the second web page. The returned second web page can include information (e.g., content) that was obtained or generated based at least in part on the designated information. In the event that process 100 is performed on a server, the server can communicate the second web page to a terminal (e.g., a client) for the terminal to display the second web page.

In some embodiments, after the server of the second web page receives the designated information, the server can send back the second web page after processing the second web page according to the designated information rather than directly sending back the second web page to the browser client without consideration of the designated information.

According to conventional art, if the browser client is displaying an order information web page of the ticket-purchasing app, and the browser client receives an instruction to jump from the order information page to a news app (e.g., the Weibo app), the browser client can send the web address included in the instruction to the server for the news app. Accordingly, the server for the news app uses the received web address to look up the home page and send the home page back to the browser client. In response to receiving the home page for the news app, the browser client displays the home page of the news app to the user. Accordingly, if the user wants to learn the latest news about the movie and the movie's leading actors, the user will also have to look up the movie title and the actor names by manually entering the movie title and the actor names into the home page. The method for obtaining information across various websites according to conventional art is thus inefficient.

Figure 2:
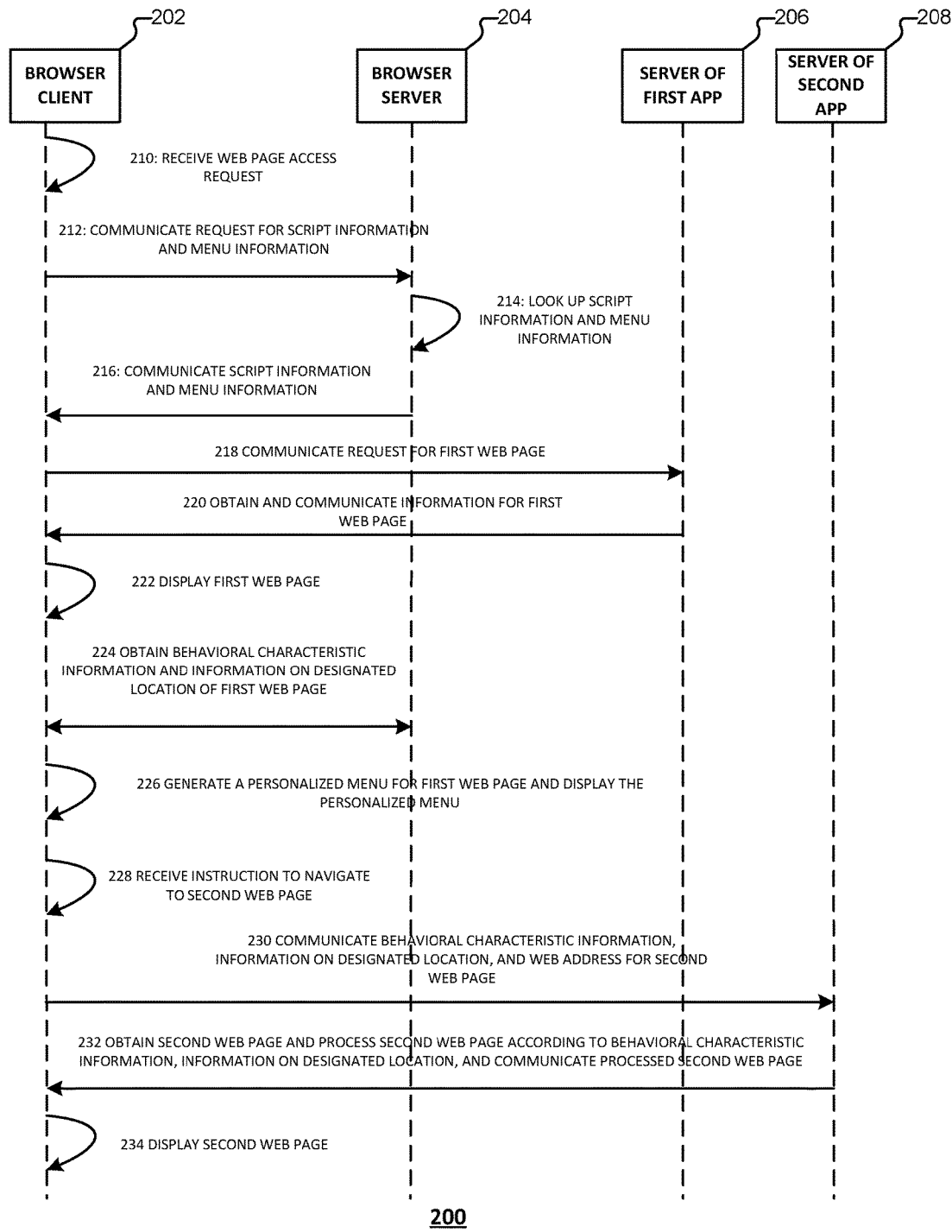
FIG. 2 is a flowchart of a method of displaying information according to various embodiments of the present application.

FIG. 2 is a flowchart of a method of displaying information according to various embodiments of the present application.

Referring to FIG. 2, process 200 can be implemented in connection with accessing or otherwise obtaining information from one or more servers associated with a web page or app. Process 200 can be implemented in connection with system 700 of FIG. 7 and to display information 300 of FIG. 3. Process 200 can be implemented by device 400 of FIG. 4, device 500 of FIG. 5, or terminal 600 of FIG. 6. At least part of process 200 can be implemented by computer system 800 of FIG. 8. In some embodiments, at least part of process 200 can be performed by a browser on a computing device such as a server or a terminal. Steps of process 200 can be implemented in various orders and various steps of process 200 can be implemented in a single step or as a series of sub-steps.

Process 200 can implement the currently logged-in user opening a first web page of a first app on a browser client 202, and selecting an option on a menu of the first web page (e.g., clicking on the menu on the first web page), and navigating (e.g., jumping) from the first web page to the second web page of the second app.

At 210, a web page access request is received. For example, a browser client 202 (e.g., installed and running on a terminal) can receive the web page access request. In some embodiments, the web page access request can be received in response to a user (e.g., the currently logged-in user) opening a first app, or selecting a link to the first web page. In some embodiments, the user communicates a web page access request to the browser client using the browser client and entering and submitting the web address corresponding to the first web page.

At 212, a request for script information and menu information is communicated. The request for the script information and the menu information can be communicated to browser server 204 (e.g., a web server) by browser client 202. In some embodiments, browser client 202 uses the web address corresponding to the first web page included in the received web page access request as a basis for sending to the browser server an acquisition request for the script information and menu information corresponding to the web address. The acquisition request can include the web address. For example, the request can be an HTTP GET request such as "HTTP GET example.com/tickets."

At 214, script information and menu information is obtained. In some embodiments, browser server 204 can look up the script information and the menu information in response to receiving the request (e.g., the acquisition request). The script information and the menu information can be obtained based at least in part on the request. For example, browser server 204 can use the web address to look up the script information and menu information determined to be corresponding to the web address among all the pre-saved script information and menu information. The browser server 204 can store mappings for webpage information, scripts information, and menu information, and/or the like.

At 216, the script information and menu information is communicated. For example, browser server 204 can send the script information and menu information corresponding to the web address to browser client 202. The script information and menu information can be sent in connection with a HTTP request, a deep link request, or the like.

At 218, a request for the first web page can be communicated. In some embodiments, browser client 202 can be communicated by browser client 202 to a server associated with the first web page. In some embodiments, browser client 202 sends an acquisition request for the first web page to the server for the first app. The acquisition request can include the web address.

At 220, information associated with the first web page is obtained and communicated. For example, the server of the first app 206 can obtain the information for the first web page and communicate the information for the first web page to the terminal (e.g., browser client 202). In some embodiments, the server for the first app looks up the first web page based at least in part on the web address (e.g., included in the request for the first web page), and communicates the first web page to browser client 202.

At 222, the first web page is displayed. In response to receiving the first web page (or information associated with the first web page), the terminal (e.g., browser client 202) can display the first web page.

At 224, behavioral characteristic information and information on the designated location of the first web page are obtained. In some embodiments, the behavioral characteristic information and information on the designated location of the first web page can be obtained using the script information. For example, browser client 202 can use the script information corresponding to the web address as a basis for acquiring the behavioral characteristic information corresponding to the user and information on the designated location in the first web page. The behavioral characteristic information and information on the designated location of the first web page can be obtained from browser server 204 or locally at the browser client 202 (e.g., the terminal).

For example, in the event that the first web page is a web page corresponding to a literature-related website, and the title of the first web page corresponds to the name of an author, the information on the designated location in the first web page could be "title" metadata for the first web page (e.g., the name of the author).

At 226, a personalized menu is generated and displayed. In some embodiments, the personalized menu is a menu for the first web page. Display of the personalized menu can comprise displaying the first web page including the personalized menu. In some embodiments, the personalized menu is generated based at least in part on behavioral characteristic information (of the user), script information, and menu information, or any combination thereof. For example, browser client 202 can use the behavioral characteristic information of the user, script information, and menu information corresponding to the web address to generate a personalized menu that is made (e.g., custom-made) for the user. The personalized menu can serve as the menu for the first web page. The generated personalized menu is rendered and displayed in connection with the first web page. For example, browser client 202 renders and displays the generated personalized menu on the first web page.

For example, in the event that the behavioral characteristic information of the user reflects the user's preference for literature and that the user is deemed to usually browse a literature-related website, then the personalized menu can have a menu option for navigating to (e.g., jumping to) a literature-related web page. In some embodiments, the personalized menu can include links that are determined based at least in part on the behavioral characteristic information that is obtained by tracking historical behavior information associated with the user (e.g., favorite web pages, a certain type of web pages, etc.).

At 228, an instruction to navigate to a second web page is received. In some embodiments, in the event that a user selects a link (e.g., clicks on a web page menu option), an instruction to navigate (e.g., jump) from the first web page to the second web page is generated. The instruction to navigate to the second web page can be generated in connection with an input to the personalized menu displayed in connection with the first web page. For example, the user sends to browser client 202 an instruction to navigate from the first web page to the second web page.

At 230, behavioral characteristic information, information on the designated location, and an address of the second web page are communicated. In some embodiments, in response to receiving the instruction to navigate to the second web page, the terminal (e.g., browser client 202) communicates the behavioral characteristic information of the user, information on the designated location in the first web page, and the web address corresponding to the second web page. The behavioral characteristic information of the user, information on the designated location in the first web page, and the web address corresponding to the second web page can be communicated to the server for the second app 208.

At 232, the second web page is obtained. The obtained second web page can be processed based at least in part on the behavioral characteristic information and information on the designated location. In some embodiments, the server for the second app 208 obtains the second web page and communicates the second web page to the terminal (e.g., browser client 202). The server for the second app 208 can process the second web page before communicating the second web page to the terminal (e.g., browser client 202). For example, server for the second app 208 can use the web address corresponding to the second web page to look up (and obtain) the second web page and process the second web page based at least in part on the behavioral characteristic information of the user and the information on the designated location in the first web page. Server for the second app 208 can send the processed second web page to browser client 202.

As an example, a currently logged on user behavior characteristic information may indicate that the user often browse the science fiction aspects of the web page. Accordingly, the user may be deemed a sci-fi enthusiasts (e.g., science-fiction may be deemed an interest of the user). In response, the browser client for the user in connection with browsing a web page can be customized to include science fiction menu options personalized menus, which can improve the convenience of the user menu. As a further example, if further information is specified, such further information can be used to provide a user with a service (e.g., such further information can serve to increase the number of filters used to identify information or services to provide to the user). For example, user behavior information characterizing features liked by the user may indicate that science fiction is an interest of the user, and such user behavior information can further specify information may be a movie, based on a writer of science fiction, a second web page associated with a science fiction movie page can be obtained.

At 234, the second web page is displayed. In some embodiments, the received processed second web page (e.g., communicated by the server for the second app 208) is displayed by the terminal (e.g., browser client 202). Browser client 202 can display the second web page received by the server of the second app 208.

In some embodiments, designated information includes information that is used by the server associated with the second web page or second web service in connection with retrieving data for display of information for the second web page or second web service. For example, in the context of movies and the first web page being a page from which movie tickets can be ordered, the designated information can include the movie title and the leading actor names. Accordingly, in the event that the browser client receives the instruction to jump from the order information web page (e.g., the first web page) to the news app home page (e.g., the second web page), the browser client can send the movie title and leading actor names, as well as the web address carried in the instruction, to the server associated with the second web page (e.g., the app server). Accordingly, the app server uses the received web address to locate the home page (e.g., the home page associated with the app or the second web page), and the app server can search on the home page using the movie title and the leading actor names as query key words. The app server can then redirect to the search results web page. In such a case, the second web page can be processed including performing query operations on the second web page and redirecting from the second web page to the query results page. Then, the news app server can regard the query results page as a processed home page and send the processed home page back to the browser client for display. In some embodiments, the browser client can display the processed home information in a browser app in the news app. Accordingly, in some embodiments, the user can directly view the latest news about the movie and the movie's leading actors on this query results page without having to manually look up information on the news about the movie or the movie's leading actors on the news app. Therefore, some embodiments increase convenience relative to the conventional process and increase the browser's display efficiency.

According to various embodiments, a browser can use the service information in an app web page that the browser has acquired as designated information and send the service information to the server for another app (e.g., a server for a second app such as an app corresponding to the second web service or second web page). Thus, the server for another app can send back to the browser the second web page including other service information related to the service information. Therefore, various embodiments simplify user operations and improve browser efficiency in displaying multiple pieces of related service information provided by different apps.

As discussed above, the obtaining of the designated information can include obtaining the designated information based at least in part on script information. For example, obtaining web page-related designated information can include script information corresponding to the first web page from a gateway server (also sometimes referred to as the browser server) configured to provide initial information to the client. The script information can correspond to information that is pre-sent by the server associated with the first web page (e.g., the first web page server that hosts the first web page) to the browser server. The obtaining of the designated information can include obtaining the web page-related designated information according to the script information.

The web page-related designated information can be designated in the script information, or the web page-related designated information can be designated by the corresponding web page server or browser server or browser client. The script information can employ, or otherwise be implemented using, various programming languages, coding standards, formats, frames, etc.

The script information can be obtained from the browser server, or obtained from the corresponding web page server (e.g., the server associated with the first web page), etc. In some embodiments, the script information is obtained locally (e.g., from a storage or resource local to the terminal). The displayed web page (e.g., the first web page) can be acquired from the corresponding web page server. In some embodiments, the obtained script information is used in connection with performing operations on information in said web page. For example, the script information can be used to perform operations including query operations, insertion operations, revision operations, deletion operations, permission modification operations, etc.

The script information can be compiled and provided by the independent software vendor (ISV) that compiled the web page (e.g., the first web page). In some embodiments, different web pages (e.g., web addresses) correspond to different script information. To make it easier for a browser client to obtain script information, each ISV may separately pre-send the script information corresponding to each of its own web pages to the browser client. Because each web page may be identified by a unique web address, the browser server can keep the script information and the correspondence between each piece of script information and the web address of the corresponding web page. In this way, the browser client does not need to acquire pieces of script information one at a time from the server for each web page. Rather, the browser client can acquire any of the script information from the browser server. Thus, unified management script information relating to various web pages can be achieved and the browser client can obtain script information more efficiently.

In some embodiments, each ISV does not need to pre-send script information to a browser server. For example, an ISV can save the script information on its own server (e.g., a server associated with the ISV). In the event that the ISV (e.g., the server associated with the ISV) receives a request for script information sent by a browser server or a browser client, the ISV (e.g., the server associated with the ISV) sends the script information back to the browser server or browser client. This way, each ISV could safeguard the script information more conveniently and flexibly, such as providing its own security for the server on which the script is stored rather than submitting to a one-size-fits-all security solution.

In some embodiments, the script information is compiled and provided by the developer of the browser server. For example, each ISV does not need to provide script information separately to each web page. Therefore, such compiling and providing of the script information by the developer of the browser server can lower the development cost to each ISV while also improving the ability of the browser server to manage and safeguard the script information.

In some embodiments, an ISV not only can provide differentiated script information for each web page based on the browser server's management and safeguarding, but also the ISV can provide differentiated menu information for each web page. The use of differentiated script information for each web page and/or the differentiated menu information for each web page can make the use of each web page more convenient for users.

The interface of a native app may include a menu. The menu can be generated by the terminal on which the native app is located. For example, the menu can be generated according to information pre-compiled by a developer. The user can click an option in this menu to achieve an app interface jumping action (e.g., in the event that a user selects an option presented in the menu, the app can perform a jump to a corresponding web page associated the option). However, regarding an app in the form of a web page, the browser client generally will provide each web page with the same menu or no menu. In some embodiments, different ISV websites (e.g., corresponding to multiple web pages) have corresponding menus specific to the particular website.

Different web pages of the websites of the same ISV can have different menus. Accordingly, the providing of menus by browser clients according to conventional art cannot satisfy the actual needs of each ISV. Therefore, the use of apps in the form of web pages can be inconvenient to users.

To address the problem in the above-described conventional art, some embodiments provide menu information for web pages via a browser server. In addition, the provided menu information can be compiled in a personalized, customized manner for each web page. In some embodiments, the menu information is compiled according to a designated uniform format. The browser client can then use the menu information provided by the browser server as a basis for separately generating menus corresponding to each web page.

In some embodiments, the menu information provided by the browser server is compiled by the corresponding ISV separately. In some embodiments, the menu information is compiled by the browser server developer. Menu information compiled by the browser server developer can be used to generate public menus that can be used by all web pages. Menu information compiled by one or more ISVs can be used to generate personalized menus used by corresponding web pages. In some embodiments, an ISV pre-sends the menu information corresponding to a web page to the browser server, and the menu information is saved at the browser server. The menu information can also be sent back after a request for menu information is received.

In view of the above, at 220, the menu information corresponding to the first web page can be obtained (e.g., from the browser server). The terminal can obtain the menu information corresponding to the first web page from the browser sever. The menu information corresponding to the first web page can be obtained before the designated information related to the first web page is obtained. The menu information can be pre-sent by the web page server (e.g., the web page server corresponding to the first web page) to the browser server.

In some embodiments, the designated information (e.g., the designated information related to the first web service, first web page, or the like) comprises at least one of: behavioral characteristic information on the currently logged-in user or information on a designated location within the first web page.

In some embodiments, the behavioral characteristics of the currently logged-in user include, but are not limited to: the search key words usually used by the user, the types of websites the user usually browses, the types of products the user usually buys, etc. On the basis of the behavioral characteristics information of the currently logged-in user, it is possible to customize for the user a personalized web page menu or web page content that suits the user's preferences and thus enhances the user's experience. The behavioral characteristics of the currently logged-in user can be determined based at least in part on historical information associated with the user. The historical information can be stored at the terminal or at a server associated with a web service or website.

Search key words usually used by the user can be determined based on a frequency by which a search key word is used, a number of times a search key word is used in a preset time, or the like. The frequency by which a search key word is used or a number of times the search key word is used can be compared to a preset search key word threshold to determine whether the corresponding search key word is deemed to be usually used by the user.

The types of websites the user usually browses can be determined based at least in part on content of a web site, metadata associated with a web site, an address, of a web site, or the like. In some embodiments, the content, metadata, address or the like associated with a set of websites can be used in determining the types of websites that the user usually browsers. The set of websites can include websites that the user visited within a preset time (e.g., within the past month, the past week, etc.), websites visited by the user for which the number of times that the user visited within a preset time exceeded a type of websites threshold, websites visited by the user for which a frequency by which the user visited the corresponding websites exceeded a threshold, or the like.

The types of products the user usually buys can be determined based at least in part on past purchase information associated with the user and/or one or more e-commerce web sites, account transaction history, or the like. In some embodiments, the type of products the user usually buys can be determined based at least in part on one or more of product information associated with a product purchased by the user, a product description associated with a product purchased by the user, metadata associated with a product purchased by the user, a quantity of a product associated with a product purchased by the user, a website from which the user purchased products, or the like. In some embodiments, product information associated with a product purchased by the user, a product description associated with a product purchased by the user, metadata associated with a product purchased by the user, a quantity of a product associated with a product purchased by the user, a website from which the user purchased products, or the like can be used in determining the types of products that the user usually buys (e.g., purchases). The set of products can include products that the user purchased within a preset time (e.g., within the past month, the past week, etc.), products purchased by the user for which the number of times that the user purchased such corresponding products within a preset time exceeded a type of products threshold, products purchased by the user for which a frequency by which the user purchased the corresponding products websites exceeded a threshold, or the like.

For example, in the event that the behavioral characteristics information of the currently logged-in user reflects the fact that the user usually browses science fiction-related websites, it can thus be surmised that the user is a science fiction fan. Thereupon, the browser client can customize a personalized menu including science fiction options for web pages browsed by the user. Thus, the convenience of menu use can be increased for the user.

Furthermore, based at least in part on the behavioral characteristic information and/or the information designating a location within a web page, it is possible to infer (e.g., determine) the service information currently desired (e.g., needed) by the user. The browser client can share the behavioral characteristic information and/or the information designating a location within a web page with another app so that the other app can provide the user with the service information that the user currently needs. In some embodiments, the browser client can save the behavioral characteristic information and/or the information designating a location within a web page to a file stored on the terminal, and the file storing the behavioral characteristic information and/or the information designating a location within a web page can be accessible (e.g., accessed) by one or more other apps. Thus, the mutual relatedness between services provided by different apps is provided. Moreover, in this case, because the menus are centrally managed and controlled by the browser client, adjusting a menu action can be executed directly by the browser client, without having to instruct each and every ISV to make adjustments. It is thus possible to increase the efficiency of menu adjustments.

Various information sources can be used in connection with obtaining the behavioral characteristic information of currently logged-in users. The behavioral information of the currently logged-in user can be generated based at least in part on big data technology. In some embodiments, the behavioral characteristic information of the currently logged-in user is pre-set in the browser client. For example, the behavioral characteristic information can be pre-set in the browser client by the currently logged-in user.

In some embodiments, in the event that web page-related designated information comprises the behavioral characteristic information of the currently logged-in user, the obtaining of the designated information (e.g., the web page-related designated information) can include using script information as a basis for acquiring an OpenID of the currently logged-in user. For a same application, each user can have its own unique OpenID. The OpenID can correspond to an identifier that associated with a user for a web page, web service, or the like. For example, the OpenID can be pre-assigned to the currently logged-in user according to the web page by the browser server. The behavioral characteristic information of the currently logged-in user from the browser server can be obtained based at least in part on (e.g., using) the OpenID. For example, the OpenID can be used in connection with a query to search for, or otherwise obtain, the applicable behavioral characteristic information.

The browser server can be different for different apps. For example, each app can have a corresponding browser server. For example, first OpenIDs assigned to a corresponding one or more users for a first app can differ from second OpenIDs assigned to a corresponding one or more users for a second app. The OpenIDs corresponding to one or more users used in different web pages in the same app can be the same. The browser server may pre-save the correspondences between OpenIDs assigned to users and the behavioral characteristic information of the users so that OpenIDs can be used to look up corresponding behavioral characteristic information.

In some embodiments, user behavioral characteristic information can be obtained based at least in part on the OpenID. In some embodiments, user behavioral characteristic information is based at least in part on one or more of a corresponding username, a corresponding mobile phone number, and other such corresponding information registered by the user in association with the app for the corresponding web page.

Furthermore, in the event that the designated information (e.g., the web page-related designated information) comprises information on the designated location within the web page, obtaining the web page-related designated information according to the script information can comprise obtaining a Document Object Model (DOM) document tree format for the web page based at least in part on (e.g., using) the menu information, and obtaining information on the designated location in the web page based at least in part on (e.g., using) the script information and the DOM document tree format.

In some embodiments, functions designated in the script information, such as getElementById( ) and getElementsByTagName( ) (e.g., the parameters in the functions were omitted to facilitate description) can be used and the web page elements can be obtained (e.g., read) from the DOM document tree format according to the DOM marks included in the DOM document tree format. The read web page elements can include the designated location information in the web page. The designated location information can serve as information that is to be shared with other apps in the future. In some embodiments, the granularity of the information to be shared is controlled by the script information. Therefore, it is possible to prevent the problems of excessive data sharing by the web page services and excessive configuration detail.

In some embodiments, the browser client obtains and displays the web page (e.g., the first web page) corresponding to the web page access request and obtains the web page-related designated information and the web page-corresponding menu information. The browser client can generate the web page menu based on the obtained information (e.g., web page-related designated information and/or the web page-corresponding menu information). For example, the browser can generate the web page menu in response to obtaining the web page-related designated information and the web page-corresponding menu information. The browser can render and display the generated menu on the web page (e.g., the first web page) for the use of the user.

Before the designated information is communicated to the server of another web page (e.g., the second web page) in response to receiving an instruction to jump (e.g., redirect) from the displayed web page (e.g., the first web page) to another web page (e.g., the second web page), user-matched menu information can be determined based at least in part on the menu information and/or the behavioral characteristic information of the currently logged-in user. For example, the menu information and/or the behavioral characteristic information of the currently logged-in user can be used as a basis for determining from within the menu information that menu information which matches the behavioral characteristic information of the currently logged-in user is to be the user-matched menu information. A menu serving (e.g., to be used) as a menu for the web page corresponding to the web page access request can be generated based at least in part on the user-matched menu information. Thereafter, the menu serving as the menu for the web page corresponding to the web page access request (e.g., the first web page) can be displayed on the web page corresponding to the web page access request (e.g., the first web page).

For example, if the menu information includes news, entertainment, sports, literature, and other such menu information, and if the behavioral characteristic information of the currently logged-in user indicates that the user usually browses sports websites, then sports-related menu information could be determined to be the user-matched menu information. A sports-related menu is then generated based on the user-matched menu information, and the generated menu is displayed on the web page. In addition to generating and displaying a sports-related menu, a public menu for the user can be generated and displayed. In addition, menus relating to some or all other areas can be generated and displayed. The browser client can display the sports-related menu in a more obvious location (e.g., at a bottom or upper-right corner of a screen on which the corresponding web page is displayed) so as to make use of the web page easier for the user.

In some embodiments, the information granularity of the menu can be adjusted (e.g., the information of the menu can be displayed in a finer granularity). For example, sports-related menu information could be more finely categorized into menu information relating to the areas of basketball, soccer, baseball, etc. The suitability of the menu for the user can thus be increasingly customized by the browser client.

In some embodiments, the instruction or request to navigate (e.g., access) the second web page can be communicated in connection with a currently logged-in user performing an operation on the menu for the web page corresponding to the web page access request (e.g., web page). For example, in response to a user selecting an option or link on the menu for the first web page, an instruction or request to navigate the second web page (e.g., an instruction to jump to the second web page) can be generated and communicated. In the event that the web page corresponding to the web page access request (e.g., the first web page) and the other web pages (e.g., the second web page) belong to different apps, the designated information can be communicated to the server for the other web page (e.g., the server associated with the second web page). In some embodiments, the communicating of the designated information to the server for the other web page includes sharing the designated cookie of the app associated with the web page corresponding to the web page access request with the app associated with the other web page. In some embodiments, the designated information is communicated to the server of said other web page. The designated information can be communicated based at least in part on the designated cookie that was shared (with the app associated with the other web page).

In some embodiments, the designated cookie can be shared between apps based at least in part on performing an operation on a low-level code of the browser client. For example, by performing an operation on the low-level code of the browser client, a cross-domain cookie can be set so as to achieve cookie sharing across different apps. In some embodiments, by stipulating a special key between different apps, one can change the upload message or, by directly adding a message, the designated information can be conveyed (e.g., shared or communicated) between different apps.

In some embodiments, in the event that a smaller quantity of data is included in designated information, the designated information can be included in the URL of the other web page and the URL can be used to transmit the designated information to the app associated with the other web page. The smaller quantity of data can include actual content of the web page to be displayed, user-related information, cookie(s), and/or the like.

In some embodiments, an ISV (e.g., each ISV) pre-sends the script information and menu information corresponding to each web page to the browser server for saving.

Figure 3:
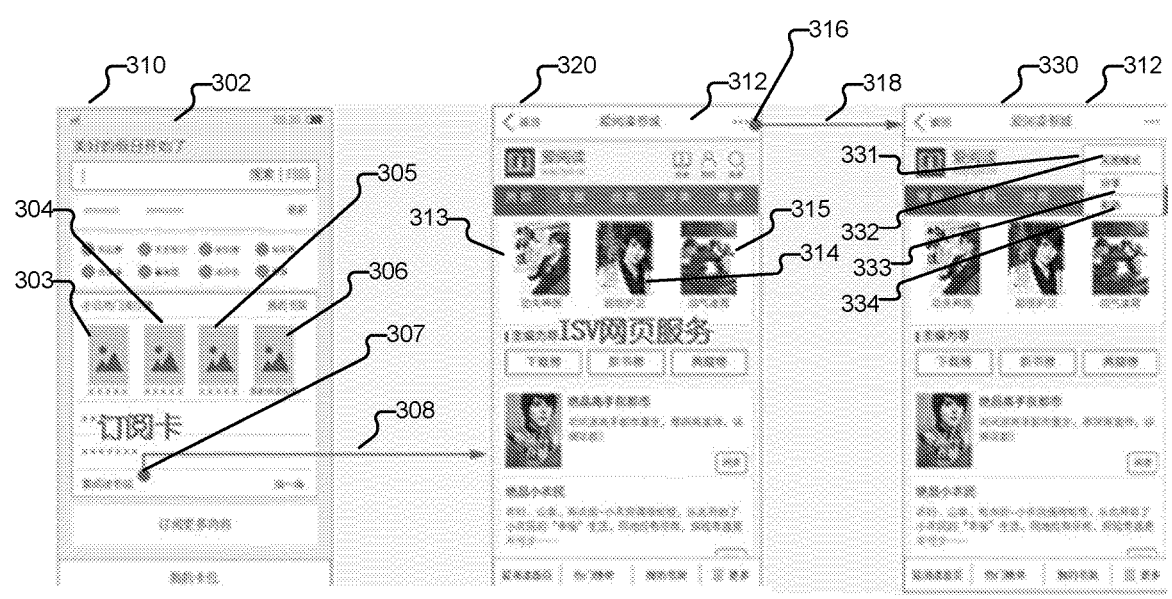
FIG. 3 is a diagram of information displayed according to various embodiments of the present application.

FIG. 3 is a diagram of information displayed according to various embodiments of the present application.

Referring to FIG. 3, information 300 can be rendered and displayed in connection with accessing or otherwise obtaining information from one or more servers associated with a web page or app. Information 300 can be displayed in connection with process 100 of FIG. 1 and/or process 200 of FIG. 2. Process 300 can be implemented by device 400 of FIG. 4, device 500 of FIG. 5, or terminal 600 of FIG. 6. Information can be rendered and/or displayed by computer system 800 of FIG. 8. In some embodiments, information 300 can be rendered and/or displayed by a browser on a computing device such as a server or a terminal.

In some embodiments, a personalized menu can be generated for the user. For example, the personalized menu can be generated based at least in part on the behavioral characteristic information corresponding to the user. The behavioral characteristic information corresponding to the user can be collected over time by (e.g., by the browser server, etc.) as the user accesses various web pages. The behavioral characteristic information corresponding to the user can be derived according to big data technology. The personalized menu can be displayed in connection with (e.g., on) the first web page. In the event that pre-acquired behavioral characteristic information of the currently logged-in user reflects (e.g., corresponds to) the user's preference for reading and literature, the browser client can customize a reading and literature-related personalized menu for the user.

Screen 310 shows that the user has opened a web page 302 via a browser client. The web page 302 can display (e.g., present to the user) a personalized menu option 307. In the web page 302, the personalized menu option 307 can correspond to "Book Lover City." As an example, the personalized menu can include one or more subscription cards for the user that are selected or generated based at least in part on the behavioral characteristic information of the user. In some embodiments, the menu option 307 conforms to the one or more preferences of the currently logged-in user. In response to an input (e.g., a click or other selection of), the menu option 307, a request 308 to navigate to a second web page (e.g., corresponding to or otherwise linked by the menu option 307) can be generated and communicated. The terminal (e.g., the browser client or other app) can navigate to web page 312 and display this web page. Screen 320 shows web page 312 that is accessed via the personalized menu of web page 302. As an example, as illustrated in 320, web page 312 can correspond to a web page of an app named "Book Lover City."

In some embodiments, the browser client uses predetermined script information as a basis for acquiring book titles 303, 304, 305, and 306 displayed in the web page 302 in the results illustration screen 310. In the event that the app (e.g., the browser client, etc.,) jumps (e.g., navigates) to web page 312, the acquired book titles can be sent to the server for "Book Lover City." Thus, the server can send to the browser client popular books that are in the same category as books 303, 304, 305, and 306. For example, as illustrated in 320, results corresponding to popular books as denoted by 313, 314, and 315 are provided.

In addition to generating a personalized menu corresponding to the user for the web page, the browser client can also generate a public menu for the web page. In the event that option 316 is selected (e.g., clicked on or tapped on), the public menu 331 can be expanded and displayed at 318. As illustrated in 330, web page 312 can include public menu 331. Public menu 331 can be displayed in the upper right-corner of the web page 312. The public menu 331 can include options such as "Text-only" 332, "Share" 333, and "Print" 334.

Figure 4:
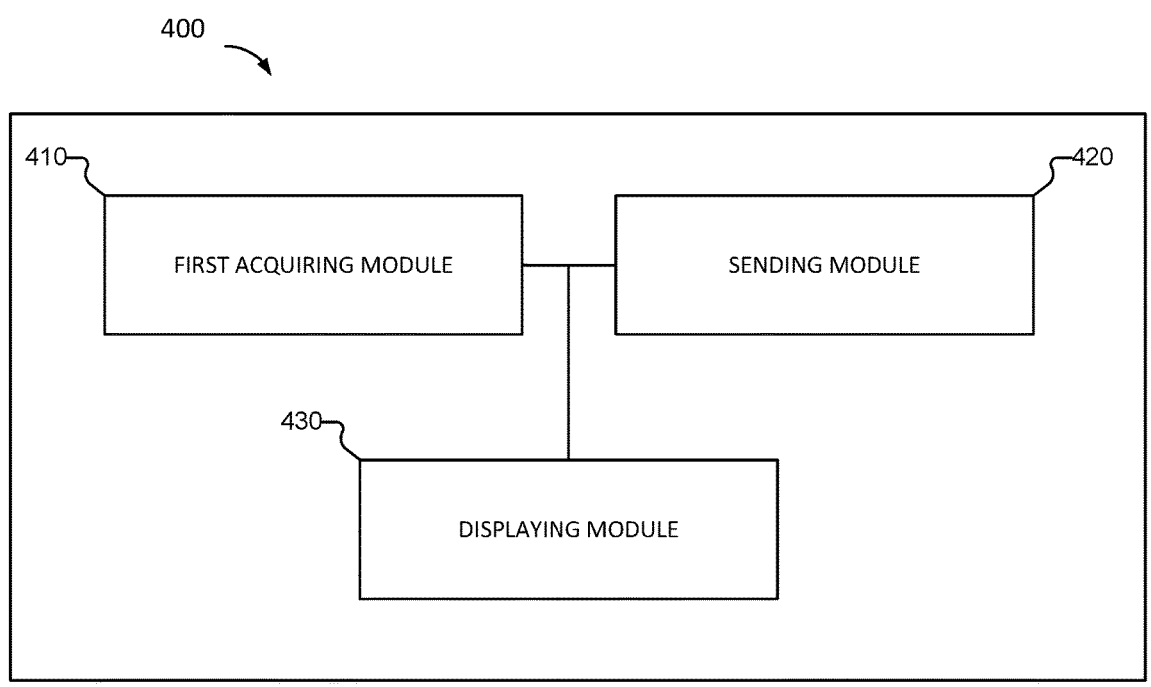
FIG. 4 is a structural block diagram of a device for displaying information according to various embodiments of the present application.

FIG. 4 is a structural block diagram of a device for displaying information according to various embodiments of the present application.

Referring to FIG. 4, device 400 can be implemented in connection with accessing or otherwise obtaining information from one or more servers associated with a web page or app. Device 400 can be implemented in connection with system 700 of FIG. 7 and to display information 300 of FIG. 3. Device 400 can implement process 100 of FIG. 1. Device 400 can implement at least part of process 200 of FIG. 2. In some embodiments, device 400 can be a computing device such as a server or a terminal.

Device 400 can include a first acquiring module 410, a sending module 420, and a displaying module 430.

The first acquiring module 410 can implement 110 and/or 120 of process 100 of FIG. 1. The first acquiring module 410 can be configured to receive a web access request. In the event that the first acquiring module receives a web access request, device 400 can display a first web page. In some embodiments, the first acquiring module 410 displays a web page (e.g., the first web page) corresponding to the web page access request. The first acquiring module 410 can obtain designated information related to the first web page. In some embodiments, the designated information includes the content of the first web page. In the event that the web access request is received by the first acquiring module 410, the obtaining of the designated information related to the first web service, first web page, or the like, can include sending (e.g., by the first acquiring module 410) a request to a server associated with the first web service, first web page, or the like.

The sending module 420 can implement 140 of process 100 of FIG. 1. In some embodiments, the sending module 420 implements 130 of process 100 of FIG. 1. The sending module 420 can be configured to communicate designated information associated with the first web page. For example, the sending module 420 can communicate the designated information to the server of another web page (e.g., the second web page). The designated information can be communicated upon (e.g., in response to) device 400 receiving an instruction or request to navigate to a second web page. In some embodiments, the instruction or request to navigate to the second web page is received in connection with the display of the first web page. For example, the instruction or request to navigate to the second web page can be received in response to a user input (e.g., to a link displayed on the first web page) to the first web page. As another example, the instruction or request to navigate to the second web page can be received in response to the execution of a script or code associated with the display of the first web page.

The displaying module 430 can implement 150 of process 100 of FIG. 1. The displaying module 430 can be configured to display the second web page (e.g., the web page that was sent back by the server of the other web page and that was generated after processing the other web page according to the designated information). In some embodiments, information associated with the second web page or second web service can be received by device 400 (e.g., the displaying module 430), and such information can be displayed. For example, the information can correspond to content associated with the second web page or second web service. Device 400 can receive the information from a server associated with the second web page or second web service. The information can be provided to the displaying module 430.

Figure 5:
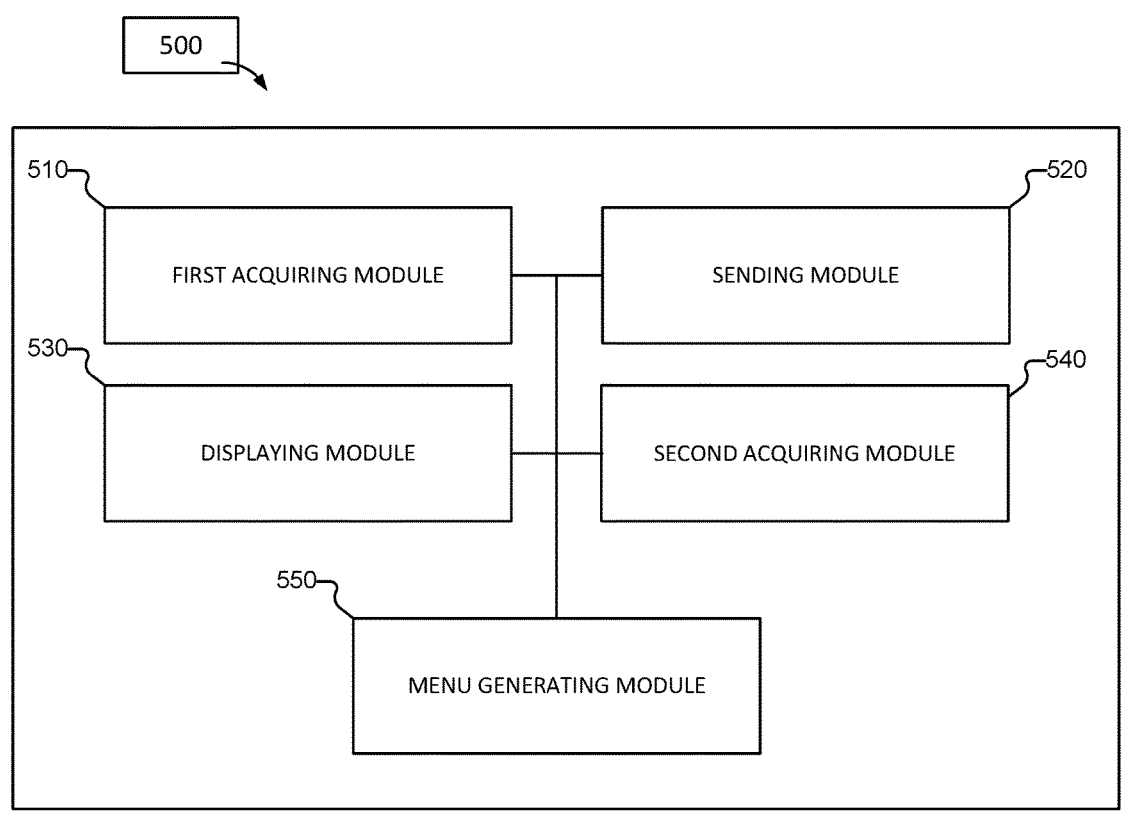
FIG. 5 is a structural block diagram of a device for displaying information according to various embodiments of the present application.

FIG. 5 is a structural block diagram of a device for displaying information according to various embodiments of the present application.

Referring to FIG. 5, device 500 can be implemented in connection with accessing or otherwise obtaining information from one or more servers associated with a web page or app. Device 500 can be implemented in connection with system 700 of FIG. 7 and to display information 300 of FIG. 3. Device 500 can implement process 100 of FIG. 1. Device 500 can implement at least part of process 200 of FIG. 2. In some embodiments, device 500 can be a computing device such as a server or a terminal.

Device 500 can include one or more of first acquiring module 510, sending module 520, displaying module 530, second acquiring module 540, and menu generating module 550. In some embodiments, first acquiring module 510 corresponds to first acquiring module 410 of device 400 of FIG. 4. In some embodiments, sending module 520 corresponds to sending module 420 of device 400 of FIG. 4. In some embodiments, displaying module 530 corresponds to displaying module 430 of device 400 of FIG. 4.

The first acquiring module 510 can be further configured to obtain script information corresponding to the first web page. The first acquiring module 510 can obtain the script information from a browser server. The script information can correspond to information that is pre-sent by a web page server (e.g., the web page server associated with the first web page) to the browser server. In some embodiments, the first acquiring module 510 can obtain web page-related designated information according to the script information. First acquiring module 510 can implement at least part of 212 and 216 of process 200 of FIG. 2.

The second acquiring module 540 can be configured to obtain menu information corresponding to the web page (e.g., the first web page). Second acquiring module 540 can obtain the menu information from a browser server. In some embodiments, second acquiring module 540 can obtain the menu information before first acquiring module 510 obtains designated information related to the web page (e.g., the first web page). The menu information can correspond to information that is pre-sent by the web page server (e.g., the web page server associated with the first web page) to the browser server. Second acquiring module 540 can implement at least part of 224 of process 200 of FIG. 2.

In some embodiments, the designated information (e.g., the web page-related designated information) comprises at least one of: behavioral characteristic information on the currently logged-in user and information on a designated location within the web page (e.g., the first web page). For example, the designated information can be metadata, tags, the logo, the banner, or previously looked up key words within the first web page. The designated information could also be information obtained in connection with accessing the first web page. For example, the designated information can include public information about a currently logged-in user or behavioral characteristic data about the currently logged-in user collected by the browser server or by a server for other apps. The currently logged-in user can correspond to a user associated with the account with which the terminal accesses the first web page. The web page-related designated information can comprise the behavioral characteristic information of the currently logged-in user.

In some embodiments, first acquiring module 510 is configured to obtain the Open ID of the currently logged-in user based at least in part on the script information. For example, first acquiring module 510 is configured to use the script information as a basis for acquiring the OpenID of the currently logged-in user. The OpenID can correspond to an identifier that is associated with a user for a web page, web service, or the like. For example, the OpenID can be pre-assigned to the currently logged-in user according to the web page by the browser server. In some embodiments, first acquiring module 510 is configured to obtain the behavioral characteristic information based at least in part on the OpenID. For example, first acquiring module 510 can be used as a basis for acquiring the behavioral characteristic information of the currently logged-in user. First acquiring module 510 can obtain the behavioral characteristic information from the browser server.

In some embodiments, first acquiring module 510 is configured to obtain the DOM document tree format for a web page (e.g., the first web page). For example, first acquiring module 510 can obtain the DOM document tree format for the web page based at least in part on (e.g., using) the menu information. First acquiring module 510 can obtain the DOM document tree format in the event that web page-related designated information comprises information on the designated location within the web page (e.g., the first web page). In some embodiments, first acquiring module 510 is configured to obtain information on the designated location in the web page based at least in part on the script information and the DOM document tree format. For example, first acquiring module 510 can use the script information and the DOM document tree format as a basis for acquiring information on the designated location in the web page.

The menu generating module 550 is configured to communicate the designated information. For example, menu generating module 550 can communicate the designated information to a server associated with another web page (e.g., a server associated with the second web page). Menu generating module 550 can communicate the designated information to the server associated with the other web page in response to receiving a request to navigate from the displayed web page (e.g., the first web page) to another web page (e.g., the second web page). Menu generating module 550 can communicate the designated information to the server associated with the other web page before sending module 520 communicates the designated information to the server of another web page. Menu generating module 550 can generate a web page menu based on the obtained information (e.g., web page-related designated information and/or the web page-corresponding menu information). For example, menu generating module 550 can generate the web page menu in response to device 500 obtaining the web page-related designated information and the web page-corresponding menu information. Menu generating module 550 can implement 226 of process 200 of FIG. 2. Menu generating module 550 can implement 230 of process 200 of FIG. 2. In some embodiments, menu generating module 550 implements 140 of process 100 of FIG. 1. Menu generating module 550 can generate a menu serving (e.g., to be used) as a menu for the web page corresponding to the web page access request. The menu can be generated based at least in part on the user-matched menu information. In response to receiving an instruction to navigate (e.g., jump) from the displayed web page to another web page, menu generating module 550 can use the menu information and the behavioral characteristic information of the currently logged-in user as a basis for determining from within the menu information that menu information which matches the behavioral characteristic information of the currently logged-in user is to be the user-matched menu information. Menu generating module 550 can use the user-matched menu information to generate a menu serving as the menu for the web page corresponding to the web page access request and display the generated menu on the web page corresponding to the web page access request.

The instruction to navigate (e.g., jump) from the displayed web page to another web page can be communicated by the currently logged-in user performing an operation on the menu of the web page corresponding to the web address. For example, the instruction to navigate from the first web page to the second web page can be generated in response to an input (e.g., to device 500) from a user. The web page corresponding to the web address belongs to an application different from the other web page.

The sending module 520 can be configured to share (e.g., communicate) the designated cookie of the app associated with the web page corresponding to the web page access request with the app(s) associated with the other web page(s). In some embodiments, the designated cookie can be shared between apps based at least in part on performing an operation on a low-level code of the browser client. For example, by performing an operation on the low-level code of the browser client, a cross-domain cookie can be set so as to achieve cookie sharing across different apps. The designated information can be communicated based at least in part on the designated cookie that was shared (with the app associated with the other web page). For example, the designated information can be communicated to the server of the other web page (e.g., the second web page) based at least in part on the cookie that was shared.

Device 400 or device 500 can be implemented in, or as, a terminal or a server.

Figure 6:
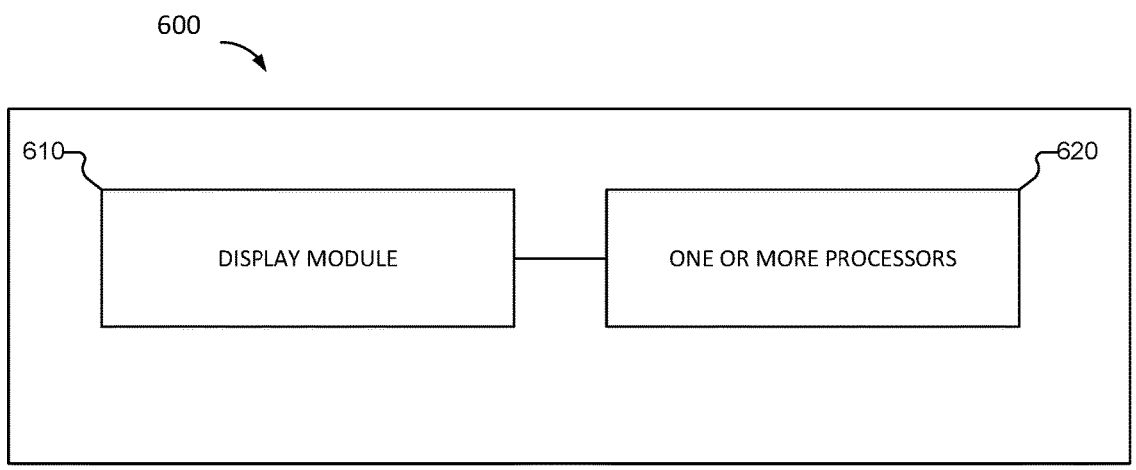
FIG. 6 is a structural block diagram of a mobile terminal for displaying information according to various embodiments of the present application.

FIG. 6 is a structural block diagram of a mobile terminal for displaying information according to various embodiments of the present application.

Referring to FIG. 6, terminal 600 can be implemented in connection with accessing or otherwise obtaining information from one or more servers associated with a web page or app. Terminal 600 can be implemented in connection with system 700 of FIG. 7 and with display of information 300 of FIG. 3. Terminal 600 can implement process 100 of FIG. 1. Terminal 600 can implement at least part of process 200 of FIG. 2. In some embodiments, Terminal 600 can be a computing device.

Terminal 600 can comprise a display module 610 and one or more processors 620.

The one or more processors 620 can be coupled to the display device module 610.

The one or more processors 620 can implement process 100 of FIG. 1 and/or process 200 of FIG. 2. The one or more processors 620 can implement device 400 of FIG. 4 and/or device 500 of FIG. 5.

In some embodiments, the browser client can be implemented (e.g., stored and executed) on terminal 600.

Figure 7:
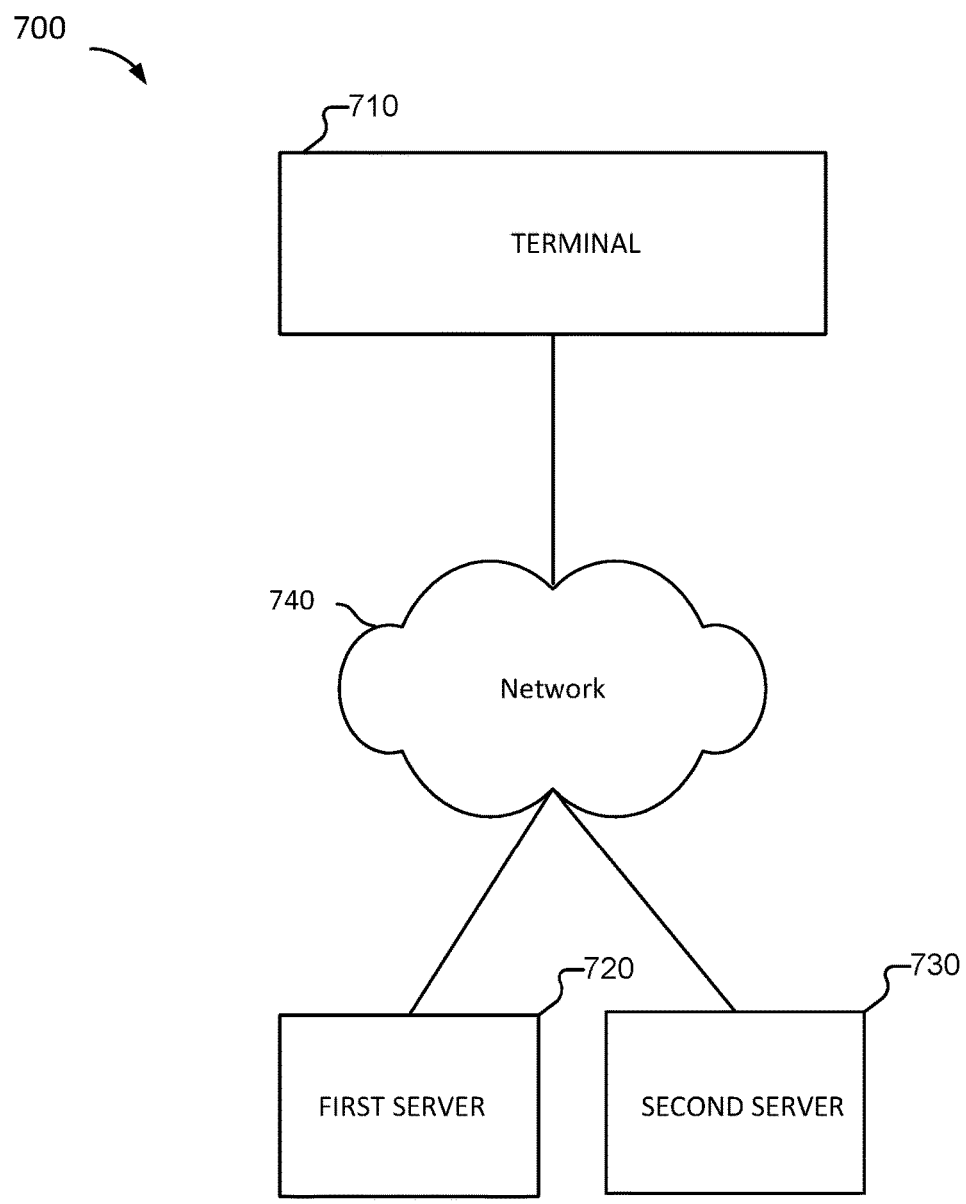
FIG. 7 is a structural block diagram of a system for displaying information according to various embodiments of the present application.

FIG. 7 is a structural block diagram of a system for displaying information according to various embodiments of the present application.

Referring to FIG. 7, system 700 can be implemented in connection with accessing or otherwise obtaining information from one or more servers associated with a web page or app. System 700 can implement process 100 of FIG. 1. In some embodiments, system 700 can implement process 200 of FIG. 2. System 700 can display information 300 of FIG. 3. System 700 can implement device 400 of FIG. 4, and/or device 500 of FIG. 5.

System 700 can include terminal 710 and a first server 720. System 700 can further include a second server 730. In some embodiments, system 700 includes a network 740 such as the Internet over which one or more of terminal 710, first server 720, and second server 730 communicate.

Terminal 710 can implement process 100 of FIG. 1 and/or process 200 of FIG. 2. In some embodiments, terminal 710 displays information 300 of FIG. 3. Terminal 710 can implement device 400 of FIG. 4 and/or device 500 of FIG. 5. In some embodiments, terminal 710 implements terminal 600 of FIG. 6.

In some embodiments, terminal 710 can obtain information associated with a first web page from first server 720 and obtain information associated with a second web page from second server 730. In some embodiments, terminal 710 can generate an instruction to navigate from a first web page to a second web page. Terminal 710 can give instructions to navigate from a first web page to a second web page based at least in part on an input from a user of terminal 710.

In some embodiments, terminal 710 includes browser client 202 of process 200 of FIG. 2. First server 720 can implement server of first app 206 of process 200 of FIG. 2.

Second server 730 can implement server of second app 208 of process 200 of FIG. 2. In some embodiments, system 700 includes a browser server (not shown) that can correspond to browser server 204 of process 200 of FIG. 2.

Figure 8:
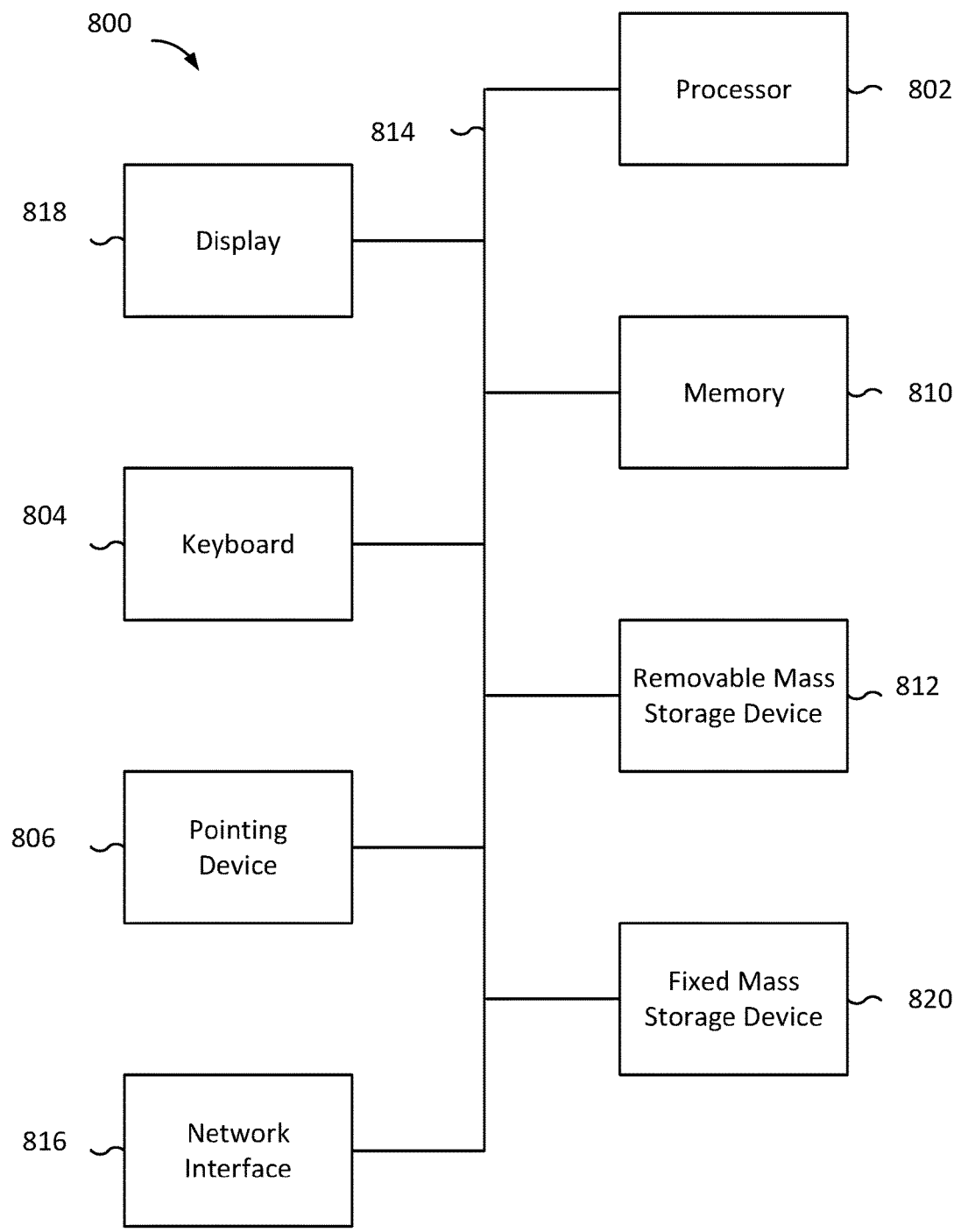
FIG. 8 is a functional diagram of a computer system for displaying information according to various embodiments of the present disclosure.

FIG. 8 is a functional diagram of a computer system for displaying information according to various embodiments of the present disclosure.

Referring to FIG. 8, a computer system 800 for displaying information is shown. As will be apparent, other computer system architectures and configurations can be used to detect a specified identifier. Computer system 800, which includes various subsystems as described below, includes at least one microprocessor subsystem (also referred to as a processor or a central processing unit (CPU)) 802. For example, processor 802 can be implemented by a single-chip processor or by multiple processors. In some embodiments, processor 802 is a general purpose digital processor that controls the operation of the computer system 800. Using instructions retrieved from memory 810, the processor 802 controls the reception and manipulation of input data, and the output and display of data on output devices (e.g., display 818).

Processor 802 is coupled bi-directionally with memory 810, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 802. Also as is well known in the art, primary storage typically includes basic operating instructions, program code, data, and objects used by the processor 802 to perform its functions (e.g., programmed instructions). For example, memory 810 can include any suitable computer-readable storage media, described below, depending on whether, for example, data access needs to be bi-directional or unidirectional. For example, processor 802 can also directly and very rapidly retrieve and store frequently needed data in a cache memory (not shown). The memory can be a non-transitory computer-readable storage medium.

A removable mass storage device 812 provides additional data storage capacity for the computer system 800, and is coupled either bi-directionally (read/write) or uni-directionally (read only) to processor 802. For example, storage 812 can also include computer-readable media such as magnetic tape, flash memory, PC-CARDS, portable mass storage devices, holographic storage devices, and other storage devices. A fixed mass storage 820 can also, for example, provide additional data storage capacity. The most common example of mass storage 820 is a hard disk drive. Mass storage device 812 and fixed mass storage 820 generally store additional programming instructions, data, and the like that typically are not in active use by the processor 802. It will be appreciated that the information retained within mass storage device 812 and fixed mass storage 820 can be incorporated, if needed, in standard fashion as part of memory 810 (e.g., RAM) as virtual memory.

In addition to providing processor 802 access to storage subsystems, bus 814 can also be used to provide access to other subsystems and devices. As shown, these can include a display monitor 818, a network interface 816, a keyboard 804, and a pointing device 806, as well as an auxiliary input/output device interface, a sound card, speakers, and other subsystems as needed. For example, the pointing device 806 can be a mouse, stylus, track ball, or tablet, and is useful for interacting with a graphical user interface.

The network interface 816 allows processor 802 to be coupled to another computer, computer network, or telecommunications network using a network connection as shown. For example, through the network interface 816, the processor 802 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 802 can be used to connect the computer system 800 to an external network and transfer data according to standard protocols. For example, various process embodiments disclosed herein can be executed on processor 802, or can be performed across a network such as the Internet, intranet networks, or local area networks, in conjunction with a remote processor that shares a portion of the processing. Additional mass storage devices (not shown) can also be connected to processor 802 through network interface 816.

An auxiliary I/O device interface (not shown) can be used in conjunction with computer system 800. The auxiliary I/O device interface can include general and customized interfaces that allow the processor 802 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 8 is but an example of a computer system suitable for use with the various embodiments disclosed herein. Other computer systems suitable for such use can include additional or fewer subsystems. In addition, bus 814 is illustrative of any interconnection scheme serving to link the subsystems. Other computer architectures having different configurations of subsystems can also be utilized.

The modules described as separate components may or may not be physically separate, and components displayed as modules may or may not be physical modules. They can be located in one place, or they can be distributed across multiple network modules. The embodiment schemes of the present embodiments can be realized by selecting part or all of the modules in accordance with actual need.

Furthermore, the functional modules in the various embodiments of the present invention can be integrated into one processor, or each module can have an independent physical existence, or two or more modules can be integrated into a single module. The aforesaid integrated modules can take the form of hardware, or they can take the form of hardware combined with software function modules.

Embodiments of the present application provide a method, a device, a terminal, and a system for displaying information. The method can comprise: upon receiving a web page access request, displaying a web page corresponding to the web page access request and obtaining designated information related to the web page. The designated information can reflect the contents of the web page. The method can further comprise, in response to receiving an instruction to navigate from the displayed web page to another web page, sending the designated information to the server of the other web page. The method can further comprise displaying the web page that was sent back by the server of the other web page and that was generated after processing the other web page according to the designated information. In some embodiments, a browser can use the service information in an app web page that the browser has acquired as designated information and send the service information and/or the designated information to the server for another app. The server for another app can send back to the browser the web page including other service information related to the service information. Therefore, various embodiments can simplify user operations and improve browser efficiency in displaying multiple pieces of related service information provided by different apps.

A person skilled in the art should understand that the embodiments of the present invention can be provided as methods, systems, or computer software products. Therefore, the present invention may take the form of complete hardware embodiments, complete software embodiments, or embodiments that combine software and hardware. Moreover, the present invention may take the form of computer program products implemented on one or more computer-operable storage media (including but not limited to magnetic disk storage, CD-ROMs, and optical storage) including computer-operable program code.

The present invention is described with reference to flowcharts and/or block diagrams based on methods, equipment (systems), and computer program products of the present invention. Please note that each flowchart and/or block diagram within the flowcharts and/or block diagrams and combinations of flowcharts and/or block diagrams within the flowcharts and/or block diagrams can be realized by computer commands. One can provide these computer commands to a general-purpose computer, a specialized computer, an embedded processor, or the processor of other programmable data equipment so as to give rise to a machine, with the result that the commands executed through the computer or processor of other programmable data equipment give rise to a device that is used to realize the functions designated by one or more processes in a flowchart and/or one or more blocks in a block diagram.

These computer program commands can also be stored on specially-operating computer-readable storage devices that can guide computers or other programmable data equipment, with the result that the commands stored on these computer-readable devices give rise to commodities that include command devices. These command devices realize the functions designated in one or more processes in a flowchart and/or one or more blocks in a block diagram.

These computer program commands can also be loaded onto a computer or other programmable data equipment, with the result that a series of operating steps is executed on a computer or other programmable equipment so as to give rise to computer processing. In this way, the commands executed on a computer or other programmable equipment provide steps for realizing the functions designated by one or more processes in a flowchart and/or one or more blocks in a block diagram.

In one typical configuration, the computation equipment comprises one or more processors (CPUs), input/output interfaces, network interfaces, and memory.

Memory may include such forms as volatile storage devices in computer-readable media, random access memory (RAM), and/or non-volatile memory, such as read-only memory (ROM) or flash memory (flash RAM). Memory is an example of a computer-readable medium.

Computer-readable media, including permanent and non-permanent and removable and non-removable media, may achieve information storage by any method or technology. Information can be computer-readable commands, data structures, program modules, or other data. Examples of computer storage media include but are not limited to phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, compact disk read-only memory (CD-ROM), digital multifunction disc (DVD) or other optical storage, magnetic cassettes, magnetic tape or magnetic disc storage, or other magnetic storage equipment or any other non-transmission media that can be used to store information that is accessible to computers. As defined in this document, computer-readable media does not include temporary computer-readable media, transitory media, such as modulated data signals and carrier waves.

Please also note that the term "comprise" or "include" or any of their variants are to be taken in their non-exclusive sense. Thus, processes, methods, merchandise, or equipment that comprises a series of elements not only comprises those elements, but also comprises other elements that have not been explicitly listed or elements that are intrinsic to such processes, methods, merchandise, or equipment. In the absence of further limitations, elements that are limited by the phrase "comprises a(n) . . . " does not exclude the existence of additional identical elements in processes, methods, merchandise, or equipment that comprises said elements.

A person skilled in the art should understand that embodiments of the present application can be provided as methods, systems or computer program products. Therefore, the present application may take the form of complete hardware embodiments, complete software embodiments, or embodiments that combine software and hardware. Moreover, embodiments of the present application may employ one or more forms of computer products that implement computer-operable storage media (including but not limited to magnetic disk storage devices, CD-ROMs, and optical storage devices) including computer-operable computer code.

The above-stated are merely embodiments of the present application and do not limit the present application. For persons skilled in the art, the present application may have various modifications and variations. Any modification, equivalent substitution, or improvement made in keeping with the spirit and principles of the present application shall be included within the scope of the claims of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprises:
   receiving a web page access request;
   in response to receiving the web page access request, obtaining a first web page from a first server;
   displaying the first web page and obtaining designated information associated with the first web page, wherein the designated information comprises content associated with the first web page;
   receiving an instruction to navigate to a second web page;
   in response to receiving the instruction to navigate to the second web page, communicating the designated information to a second server associated with the second web page, wherein the designated information comprises: behavioral characteristic information associated with a user, information associated with a designated location within the first web page, or both;
receiving information associated with the second web page from the second server; and
displaying the second web page.

2. The method of claim 1, wherein the second web page was generated by the second server after processing the second web page based at least in part on the designated information.

3. The method of claim 1, wherein the obtaining of the designated information associated with the first web page comprises:
obtaining script information corresponding to the first web page; and
obtaining the designated information based at least in part on the script information.

4. The method of claim 3, wherein the script information is obtained from a browser server, and the script information was pre-sent by the first server to the browser server.

5. The method of claim 3, further comprising:
obtaining menu information corresponding to the first web page before the designated information is obtained.

6. The method of claim 5, wherein the menu information is obtained from a browser server, and the menu information was pre-sent by the first server to the browser server.

7. The method of claim 1, wherein the obtaining of the designated information comprises:
obtaining script information corresponding to the first web page; and
obtaining the designated information based at least in part on the script information, wherein the designated information comprises the behavioral characteristic information associated with the user, the obtaining of the designated information based at least in part on the script information comprising:
obtaining an identifier associated with the user based at least in part on the script information, wherein the identifier is a pre-assigned identifier that is stored on a server that is accessed in connection with a display of the first web page associated with the user; and
obtaining the behavioral characteristic information associated with the user based at least in part on the identifier associated with the user.

8. The method of claim 7, wherein the behavioral characteristic information associated with the user is obtained from a browser server.

9. The method of claim 1, wherein the obtaining of the designated information comprises:
obtaining script information corresponding to the first web page;
obtaining menu information corresponding to the first web page; and
obtaining the designated information based at least in part on the script information, wherein the designated information comprises information associated with a designated location within the first web page, the obtaining of the designated information based at least in part on the script information comprising:
obtaining a Document Object Model (DOM) document tree corresponding to the first web page based at least in part on the menu information; and
obtaining the designated location within the first web page based at least in part on the script information and the DOM document tree.

10. The method of claim 1, further comprising:
obtaining menu information corresponding to the first web page;
determining a subset of the menu information that corresponds to the behavioral characteristic information associated with the user based at least in part on the menu information and the behavioral characteristic information associated with the user, wherein the behavioral characteristic information associated with the user is included in the designated information;
generating a menu for the first web page based at least in part on the subset of the menu information; and
displaying the menu for the first web page on the first web page.

11. The method of claim 1, wherein:
the instruction to navigate to the second web page is received in response to the user performing an operation on a menu of the first web page;
the first web page corresponds to a first app and the second web page corresponds to a second app, the first app and the second app being different; and
the communicating of the designated information to the second server comprising:
sharing a designated cookie of the first app with the second app; and
communicating the designated information to the second server associated with the second web page based at least in part on the designated cookie.

12. A device, comprising:
one or more processors configured to:
receive a web page access request;
in response to receiving the web page access request, obtain a first web page from a first server, display the first web page and obtain designated information associated with the first web page, wherein the designated information comprises content associated with the first web page;
receive an instruction to navigate to a second web page;
in response to receiving the instruction to navigate to the second web page, communicate the designated information to a second server associated with the second web page, wherein the designated information comprises: behavioral characteristic information associated with a user, information associated with a designated location within the first web page, or both;
receive information associated with the second web page from the second server; and
display the second web page; and
a memory coupled to the one or more processors and configured to provide the one or more processors with instructions.

13. The device of claim 12, wherein the second web page was generated by the second server after processing the second web page based at least in part on the designated information.

14. The device of claim 12, wherein to obtain the designated information associated with the first web page comprises obtaining script information corresponding to the first web page, and obtaining the designated information based at least in part on the script information.

15. The device of claim 14, wherein the script information is obtained from a browser server, and the script information was pre-sent by the first server to the browser server.

16. The device of claim 14, wherein the one or more processors are further configured to:
obtain menu information corresponding to the first web page before the designated information is obtained.

17. The device of claim 16, wherein the menu information is obtained from a browser server, and the menu information was pre-sent by the first server to the browser server.

18. The device of claim 12, wherein to obtain the designated information comprises to:
obtain script information corresponding to the first web page; and
obtain the designated information based at least in part on the script information, wherein the designated information comprises the behavioral characteristic information associated with the user, to obtain the designated information based at least in part on the script information comprises to:
obtain an identifier associated with the user based at least in part on the script information, wherein the identifier is a pre-assigned identifier that is stored on a server that is accessed in connection with a display of the first web page associated with the user; and
obtain the behavioral characteristic information associated with the user based at least in part on the identifier associated with the user.

19. The device of claim 18, wherein the behavioral characteristic information associated with the user is obtained from a browser server.

20. The device of claim 12, wherein to obtain the designated information comprises to:
obtain script information corresponding to the first web page;
obtain menu information corresponding to the first web page; and
obtain the designated information based at least in part on the script information, wherein the designated information comprises information associated with a designated location within the first web page, the obtaining of the designated information based at least in part on the script information comprises to:
obtain a Document Object Model (DOM) document tree corresponding to the first web page based at least in part on the menu information; and
obtain the designated location within the first web page based at least in part on the script information and the DOM document tree.

21. The device of claim 12, wherein the one or more processors are further configured to:
obtain menu information corresponding to the first web page;
determine a subset of the menu information that corresponds to the behavioral characteristic information associated with the user based at least in part on the menu information and the behavioral characteristic information associated with the user, wherein the behavioral characteristic information associated with the user is included in the designated information;
generate a menu for the first web page based at least in part on the subset of the menu information; and
display the menu for the first web page on the first web page.

22. The device of claim 12, wherein:
the instruction to navigate to the second web page is received in response to the user performing an operation on a menu of the first web page;
the first web page corresponds to a first app and the second web page corresponds to a second app, the first app and the second app being different; and
to communicate the designated information to the second server associated with the second web page comprises to:
share a designated cookie of the first app with the second app; and
communicate the designated information to the second server associated with the second web page based at least in part on the designated cookie.

23. A computer program product, the computer program product being embodied in a non-transitory computer readable storage medium and comprising computer instructions for:
receiving a web page access request;
in response to receiving the web page access request, obtaining a first web page from a first server;
displaying the first web page and obtaining designated information associated with the first web page, wherein the designated information comprises content associated with the first web page;
receiving an instruction to navigate to a second web page;
in response to receiving the instruction to navigate to the second web page, communicating the designated information to a second server associated with the second web page, wherein the designated information comprises: behavioral characteristic information associated with a user, information associated with a designated location within the first web page, or both;
receiving information associated with the second web page from the second server; and
displaying the second web page.

24. A system, comprising:
a first web server associated with a first web page, comprising:
one or more processors configured to:
receive, from a terminal, a web page access request to access the first web page; and
communicate the first web page to the terminal, wherein the first web page is displayed by the terminal; and
a memory coupled to the one or more processors and configured to provide the one or more processors with instructions; and
a second server associated with a second web page comprising:
one or more processors configured to:
receive, from the terminal, designated information, wherein the designated information comprises content associated with the first web page, and behavioral characteristic information associated with a user, information associated with a designated location within the first web page, or both, and wherein the designated information is communicated by the terminal to the second server in response to the terminal receiving an instruction to navigate to the second web page; and
communicate the second web page to the terminal; and
a memory coupled to the one or more processors and configured to provide the one or more processors with instructions.

25. A method, comprising:
receiving, by a first server associated with a first web page, a web page access request to access the first web page, the web page access request being communicated to the first server by a terminal;
communicating, by the first server, the first web page to the terminal, wherein the first web page is displayed by the terminal;
receiving, by a second server associated with a second web page, designated information, the designated information being communicated to the second server by the terminal, wherein the designated information comprises content associated with the first web page, and behavioral characteristic information associated with a user, information associated with a designated location within the first web page, or both, and wherein the designated information is communicated by the terminal to the second server in response to the terminal receiving an instruction to navigate to the second web page; and communicating, by the second server, the second web page to the terminal.

* * * * *

UNITED STATES PATENT AND TRADEMARK OFFICE
CERTIFICATE OF CORRECTION

PATENT NO. : 10,367,909 B2
APPLICATION NO. : 15/286840
DATED : July 30, 2019
INVENTOR(S) : Zhang et al.

It is certified that error appears in the above-identified patent and that said Letters Patent is hereby corrected as shown below:

In the Drawings

In sheet 5, figure 5, delete "" and insert ----, therefor.

Signed and Sealed this
Twenty-second Day of September, 2020

Andrei Iancu
*Director of the United States Patent and Trademark Office*